US012257838B2

(12) United States Patent
Yamamoto

(10) Patent No.: US 12,257,838 B2
(45) Date of Patent: Mar. 25, 2025

(54) INKJET HEAD MODULE HOLDER ASSEMBLY AND INKJET RECORDER

(71) Applicant: Konica Minolta, Inc., Tokyo (JP)

(72) Inventor: Kenichi Yamamoto, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 290 days.

(21) Appl. No.: 17/834,028

(22) Filed: Jun. 7, 2022

(65) Prior Publication Data

US 2022/0396074 A1 Dec. 15, 2022

(30) Foreign Application Priority Data

Jun. 9, 2021 (JP) ................................ 2021-096607

(51) Int. Cl.

*B41J 2/14* (2006.01)
*B41J 25/00* (2006.01)
*B41J 25/34* (2006.01)

(52) U.S. Cl.

CPC ........... *B41J 2/14201* (2013.01); *B41J 25/34* (2013.01); *B41J 2025/008* (2013.01); *B41J 2202/14* (2013.01); *B41J 2202/19* (2013.01); *B41J 2202/20* (2013.01)

(58) Field of Classification Search

CPC .... B41J 2/14201; B41J 2202/14; B41J 25/34; B41J 2025/008; B41J 2202/19; B41J 2202/20

See application file for complete search history.

(56) References Cited

U.S. PATENT DOCUMENTS

| | | | | |
|---|---|---|---|---|
| 2010/0026759 A1* | 2/2010 | Kobayashi | ............... | B41J 2/145 347/40 |
| 2019/0283435 A1 | 9/2019 | Urakami | | |
| 2019/0329574 A1 | 10/2019 | Kobayashi | | |

FOREIGN PATENT DOCUMENTS

| | | | | |
|---|---|---|---|---|
| JP | H1016348 A | * 1/1998 | ............ | B41J 25/304 |
| JP | H11334121 A | * 12/1999 | .............. | B41J 2/325 |
| JP | 2001253136 A | 9/2001 | | |
| JP | 2009090666 A | * 4/2009 | .............. | B41J 2/175 |
| JP | 2011161875 A | 8/2011 | | |
| JP | 2019155880 A | 9/2019 | | |
| JP | 2019188759 A | 10/2019 | | |

OTHER PUBLICATIONS

JPO Notice of Reasons of Refusal for corresponding JP Application No. 2021-096607; Issued Jan. 7, 2025.

* cited by examiner

*Primary Examiner* — Yaovi M Ameh

(74) *Attorney, Agent, or Firm* — CANTOR COLBURN LLP

(57) ABSTRACT

A holder assembly that holds a head module including an inkjet head on a mounting table, the holder assembly including a pressure member and an operation member. The pressure member presses a portion of the head module adjacent to the mounting table. The operation member transitions the pressure member from a first state to a second state when work of mounting the head module on the mounting table is performed. In the first state, the pressing by the pressure member is deactivated, and in the second state, the pressing by the pressure member is activated. The operation member exists outside an enveloping surface of the head module during the work of mounting the head module on the mounting table.

15 Claims, 13 Drawing Sheets

1001

INKJET HEAD MODULE HOLDER ASSEMBLY AND INKJET RECORDER

CROSS REFERENCES TO RELATED APPLICATIONS

The present invention claims priority under 35 U.S.C. § 119 to Japanese Application No. 2021-096607, filed on Jun. 9, 2021, the entire contents of which being incorporated herein by reference.

BACKGROUND

Technical Field

The present disclosure relates to a holder assembly that holds an inkjet head module on a mounting table and an inkjet recorder provided with such holder assemblies.

Description of the Related Art

An example inkjet head module is two head bodies bundled together, peripheral surfaces covered in an aluminum sheet metal exterior, with an integrated ink flow path member and bracket. Each head body includes a storage, and after storing ink supplied from the ink flow path member in the storage, ink is ejected from nozzles on a bottom surface by a method of heating and pressurizing. At this time, the ink is supplied from the ink flow path member in a heated state, and therefore the exterior thermally expands due to heat from the ink. Therefore, if the inkjet head module is firmly fixed to a mounting table by screws, expansion and contraction of the exterior cannot be avoided. In addition to thermal expansion, the mounting table may become warped, and if a bottom plate of the inkjet head module remains firmly fixed, the bottom plate of the inkjet head module may warp to follow the shape of the mounting table.

In order to avoid expansion and contraction of the exterior and prevent the module bottom plate from warping, it is necessary to mount the inkjet head module on the mounting table in way that leaves some play between the inkjet head module and the mounting table.

Therefore, in a conventional inkjet recorder, an inkjet head module is held on the mounting table by an elastic force of a coil spring and screws. According to an inkjet recorder described in US 2019/283435, a pressure member having a structure in which a coil spring having a diameter smaller than that of a screw head and a washer having a diameter larger than that of the coil spring are inserted in this order along a screw shaft.

While sandwiching a bracket of the inkjet head module between the washer and the mounting table, the head of the screw is fitted into a screw hole of the mounting table to press the inkjet head module against the mounting table by elastic force of the coil spring. By using such a pressure member, it is possible to hold the inkjet head module on the mounting table and maintain a held state while absorbing thermal expansion of the exterior due to ink passing through.

In order to screw a screw shaft of a screw spring, which is a pressure member, into a mounting table, screw tightening work is necessary on the mounting table on which the inkjet head module is mounted. Such screw tightening work is preferably performed in a work space with an upper opening, in order that the screw spring can move up and down, the screw shaft can be aligned, and a screwdriver can be turned smoothly.

However, when mounting an inkjet head module in an inkjet recorder, it is difficult to secure a work space with an upper opening. This is because some ink flow path members of the inkjet head module are provided to an upper part of the inkjet head module and transfer ink to and from an adjacent inkjet head module and therefore occupy space above a place where screw tightening should be performed. As space where fingers holding a screwdriver can freely move becomes very narrow, there is a technical problem of poor workability where screw tightening cannot progress at all.

SUMMARY

An object of the present disclosure is to provide an inkjet head module holder assembly and an inkjet recorder capable of pressing down an inkjet head module and holding it on a mounting table in a work space without an upper opening.

To achieve at least the abovementioned object, a holder assembly reflecting one aspect of the present disclosure is a holder assembly that holds a head module including an inkjet head on a mounting table, the holder assembly including a pressure member and an operation member. The pressure member presses a portion of the head module adjacent to the mounting table. The operation member transitions the pressure member from a first state to a second state when work of mounting the head module on the mounting table is performed. In the first state, the pressing by the pressure member is deactivated, and in the second state, the pressing by the pressure member is activated. The operation member exists outside an enveloping surface of the head module during the work of mounting the head module on the mounting table.

An inkjet recorder reflecting another aspect of the present disclosure is an inkjet recorder that conveys a recording medium and forms an image using an inkjet method on a conveyed recording medium, the inkjet recorder including a mounting table, head modules each including an inkjet head, an ink supply member that supplies heated ink to the head modules, and holder assemblies. Each of the holder assemblies including a pressure member and an operation member. The pressure member presses a portion of a corresponding one of the head modules adjacent to the mounting table. The operation member transitions the pressure member from a first state to a second state when work of mounting the head module on the mounting table is performed. In the first state, the pressing by the pressure member is deactivated, and in the second state, the pressing by the pressure member is activated. The operation member exists outside an enveloping surface of the corresponding one of the head modules during the work of mounting the head module on the mounting table.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Hereinafter, one or more embodiments of the present disclosure will be described with reference to the drawings. However, the scope of the invention is not limited to the disclosed embodiments.

The following describes embodiments of an inkjet head module holder assembly and an inkjet recorder including an inkjet head module holder assembly, with reference to the drawings.

[1] Inkjet Recorder

Figure 1:
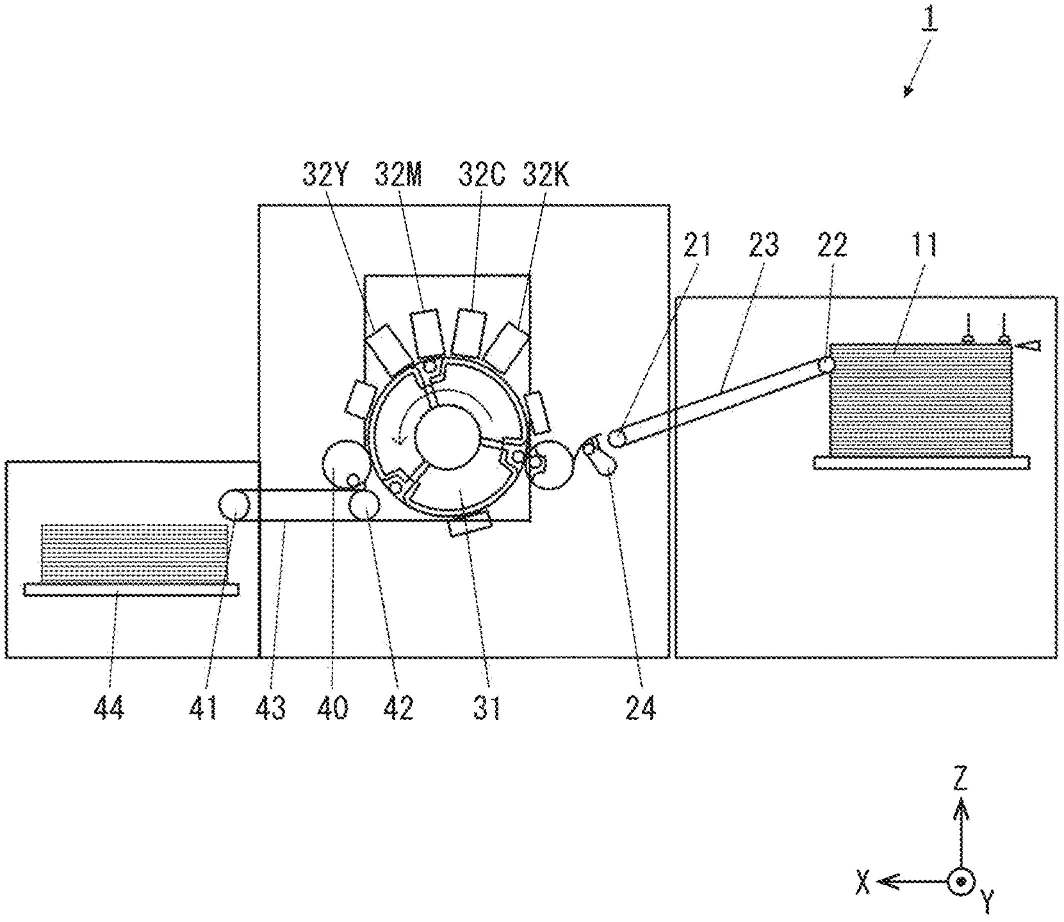
FIG. 1 is a diagram illustrating an overall structure of an inkjet recorder 1 provided with an inkjet head module holder assembly according to the present disclosure.

FIG. 1 illustrates structure of an inkjet recorder according to the present disclosure. FIG. 1 is a diagram illustrating an overall structure of an inkjet recorder 1 provided with a module holder assembly according to the present disclosure. In FIG. 1, the X axis direction is a conveyance direction of a recording medium, the Z axis is a height direction, and the Y axis is a depth direction. The inkjet recorder illustrated in FIG. 1 includes image forming units 32Y, 32M, 32C, 32K, which are YMCK color image forming units. Each of the image forming units 32Y, 32M, 32C, 32K includes an array of eight (4×2) inkjet head modules and an ink supply unit that supplies heated ink to each inkjet head module. Each inkjet head module has, for example, 1024 nozzles, and forms a desired image on a recording medium with a resolution of 360 nozzles per inch. As a recording medium, various materials having various thicknesses can be used, such as printing paper, cells, films, and fabrics.

As illustrated in FIG. 1, the inkjet recorder according to the present disclosure feeds out a top recording medium from a stack on a medium supply tray 11 and delivers the recording medium to an image forming drum 31 via travel of a belt 23 due to rotation of rollers 21, 22, and gripping by one end of a claw 24.

The image forming units 32Y, 32M, 32C, 32K are arranged at defined intervals along a rotation direction of the image forming drum 31 at positions a defined distance from an outer circumferential surface of the image forming drum 31. An image is formed by the image forming units 32Y, 32M, 32C, 32K on a recording medium delivered to the image forming drum 31. Subsequently, the recording medium is transferred from the image forming drum 31 to the belt 43 by a roller 40 and is delivered to an ejection tray 44 by travel of the belt 43 due to rotation of the rollers 41, 42.

Figure 2:
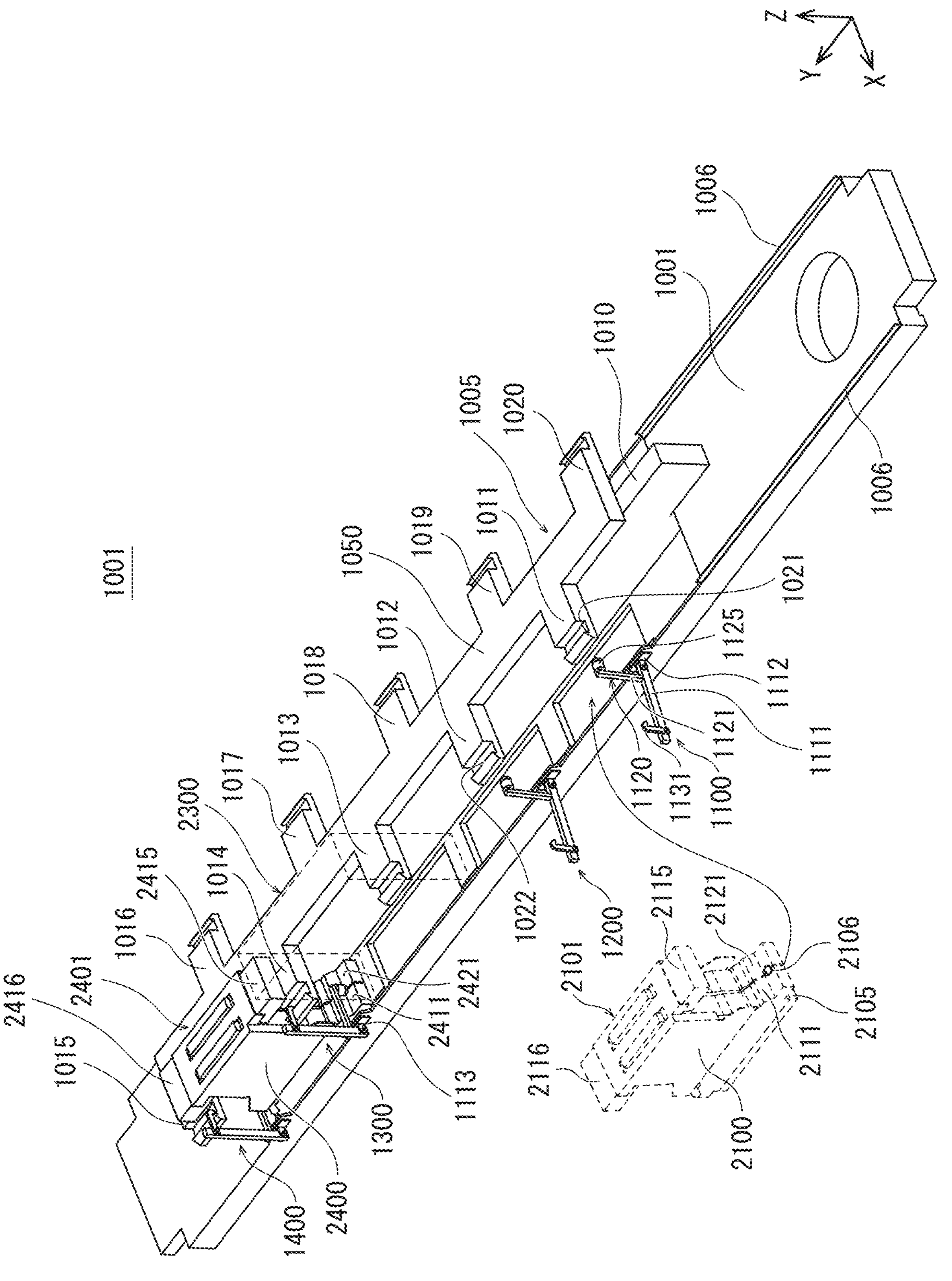
FIG. 2 is a perspective view diagram illustrating a mounting table 1001.

[2] Image Forming Unit Structure p The image forming units 32Y, 32M, 32C, 32K each include a mounting table 1001 as illustrated in FIG. 2. FIG. 2 is a perspective view diagram illustrating the mounting table 1001, in which the Y axis is a main scanning direction of a recording medium, the Z axis is a height direction, and the X axis is a conveyance direction of the recording medium. The mounting table 1001 has a long shape and standing walls 1006 stand up at 90° from edges in a Y axis direction on both sides in an X axis direction, and a reinforcing wall 1010 stands up in the Y axis direction in a center of the X axis direction.

An upper structure 1005 tops the reinforcing wall 1010. and has a comb-toothed shape.

The comb-toothed shape of the present embodiment is that of a plurality of teeth 1011-1020 extending from each of two long sides of a trunk 1050 that has a long shape.

The teeth 1011, 1012, 1013, 1014, 1015 extend from an X axis positive direction of the trunk 1050, and the teeth 1016, 1017, 1018, 1019, 1020 extend from an X axis negative direction of the trunk 1050. The teeth 1011-1015 are arranged along the Y axis direction at regular intervals, and the teeth 1016-1020 are also arranged along the Y axis direction at regular intervals.

(2-1) Mounting Position of Inkjet Head Module

The spaces between the teeth 1011-1015 are mounting positions for inkjet head modules in which four inkjet head modules are arranged side by side along the Y axis direction, A row of inkjet head modules arranged along the teeth 1011, 1012, 1013, 1014, 1015 is defined herein as a first row.

The spaces between the teeth 1016-1020 are also mounting positions for inkjet head modules in which four inkjet head modules are arranged side by side along the Y axis direction. A row of inkjet head modules arranged along the teeth 1016, 1017, 1018, 1019, 1020 is defined herein as a second row. As a result of arranging the inkjet head modules in the first row and the second row, a total of 4×2 inkjet head modules are mounted on the mounting table 1001.

Each of the inkjet head modules mounted in mounting positions has the same structure. The following is a description of an inkjet head module 2400 mounted at a mounting position between the tooth 1014 and the tooth 1015, as illustrated in FIG. 2. The inkjet head module 2400 includes a head body 2401, an ink flow path member 2415, and brackets 2411, 2421. The ink flow path member 2415 is attached at an upper portion in the Z axis direction of the head body 2401, and the brackets 2411, 2421 are attached at a lower portion in the Z axis direction of the head body 2401. The ink flow path member 2415 and the brackets 2411, 2421 all extend in the Y direction from the head body 2401, and all occupy a cuboid space 2300.

The cuboid space 2300 is a space surrounded by an enveloping surface: a pair of surfaces orthogonal to the X axis direction, a pair of surfaces orthogonal to the Y axis direction, and a pair of surfaces orthogonal to the Z axis direction. This enveloping surface is a virtual surface circumscribing the most extreme portions of the inkjet head module in the X axis, Y axis, and Z axis directions.

(2-2) Ink Flow Path

Inside each of the teeth 1011-1020 is formed a connecting path member (not shown) connected to the ink flow path members.

The teeth 1011-1020 support the ink flow path members of the 4×2 inkjet head modules from below, and the connecting path members of the teeth communicate with the ink flow path members to form an ink flow path between inkjet head modules that are adjacent in the Y direction. Ink is supplied to the 4×2 inkjet head modules through these ink flow paths.

[3] Inkjet Head Module Holder Assembly

The inkjet head module holder assemblies 1100, 1200 of FIG. 2 are provided at mounting positions in the Y axis direction corresponding to the teeth 1011, 1012, and the inkjet head module holder assemblies 1300, 1400 are provided at mounting positions in the Y axis direction corresponding to the teeth 1014, 1015. Although not shown in FIG. 2, similar inkjet head module holder assemblies are provided at each of the 2×4 mounting positions.

Figure 3A:
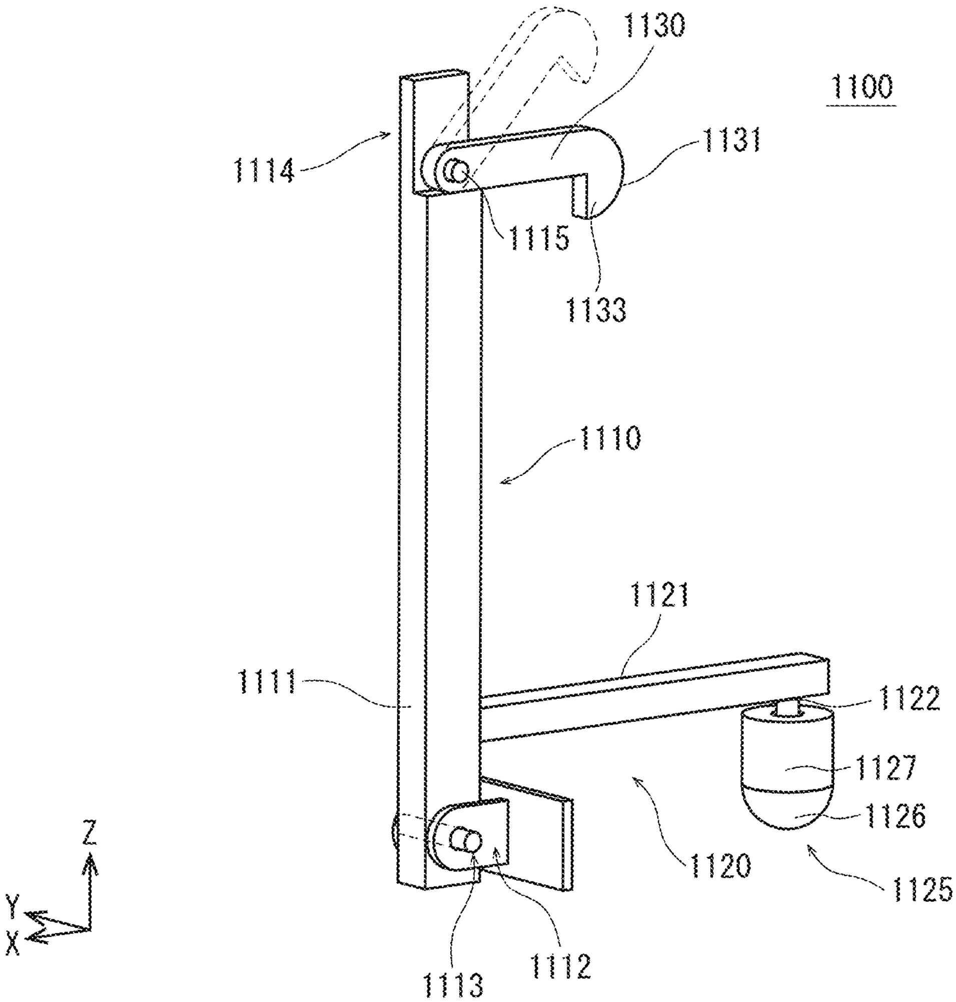
FIG. 3A is a perspective view diagram illustrating a structure of an inkjet head module holder assembly according to Embodiment 1.
Figure 3B:
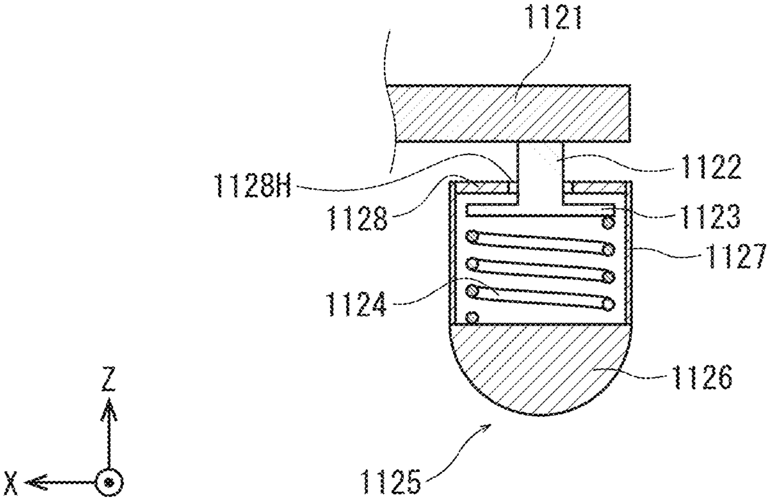
FIG. 3B is a cross-section diagram of a pressure head 1125.

The 8×2 inkjet head module holder assemblies each have a common structure. The common structure of the 8×2 inkjet head module holder assemblies is described below with reference to FIG. 3A and FIG. 3B. FIG. 3A is a perspective view diagram illustrating the inkjet head module holder assembly according to Embodiment 1. As illustrated, the inkjet head module holder assembly 1100 includes an operation member 1110 and a pressure member 1120.

Holding by the inkjet head module holder assembly is achieved by the pressure head 1125 of the pressure member 1120 pressing a portion of the inkjet head module 2100 that is adjacent to the mounting table 1001 (the portion 2106 in FIG. 2).

Pressing by the pressure head 1125 of the pressure member 1120 is achieved by an operation applied to the operation member 1110 transitioning the pressure member 1120 from a first state to a second state.

In the first state, pressure on the portion 2106 by the pressure head 1125 is deactivated. Deactivated here means that the pressure head 1125 is not in contact with or pressing on the portion 2106.

The second state means that the pressure head is in contact with and pressing on the portion 2106. Pressure from the pressure head 1125 includes pressure due to a user gripping and swinging an operating lever 1111, and pressure due to an elastic force from an elastic member, both described below.

(3-1) Operation Member 1110

The operation member 1110 includes the operating lever 1111, an angle bearing 1112, a shaft 1113, and a lock member (consisting of a lock lever 1130 and a lock claw 1131).

The operating lever 1111 is pivotally supported by inserting the shaft 1113 into a through hole (not shown) formed at a base end of the operating lever 1111so the operating lever 1111 can swing freely about the shaft 1113. A free end of the operating lever 1111 is cut out to form a thin-walled portion 1114.

The lock lever 1130 of the lock member is pivotally supported by inserting a pin 1115 in the same direction as the axis of the shaft body 1113 through a thin portion 1114 which is located at the free end of the operation lever 1111 so that the lock lever 1130 of the lock member can swing about the pin 1115 from a horizontal orientation illustrated by solid lines to an orientation illustrated by dashed lines in FIG. 3A.

Figure 4:
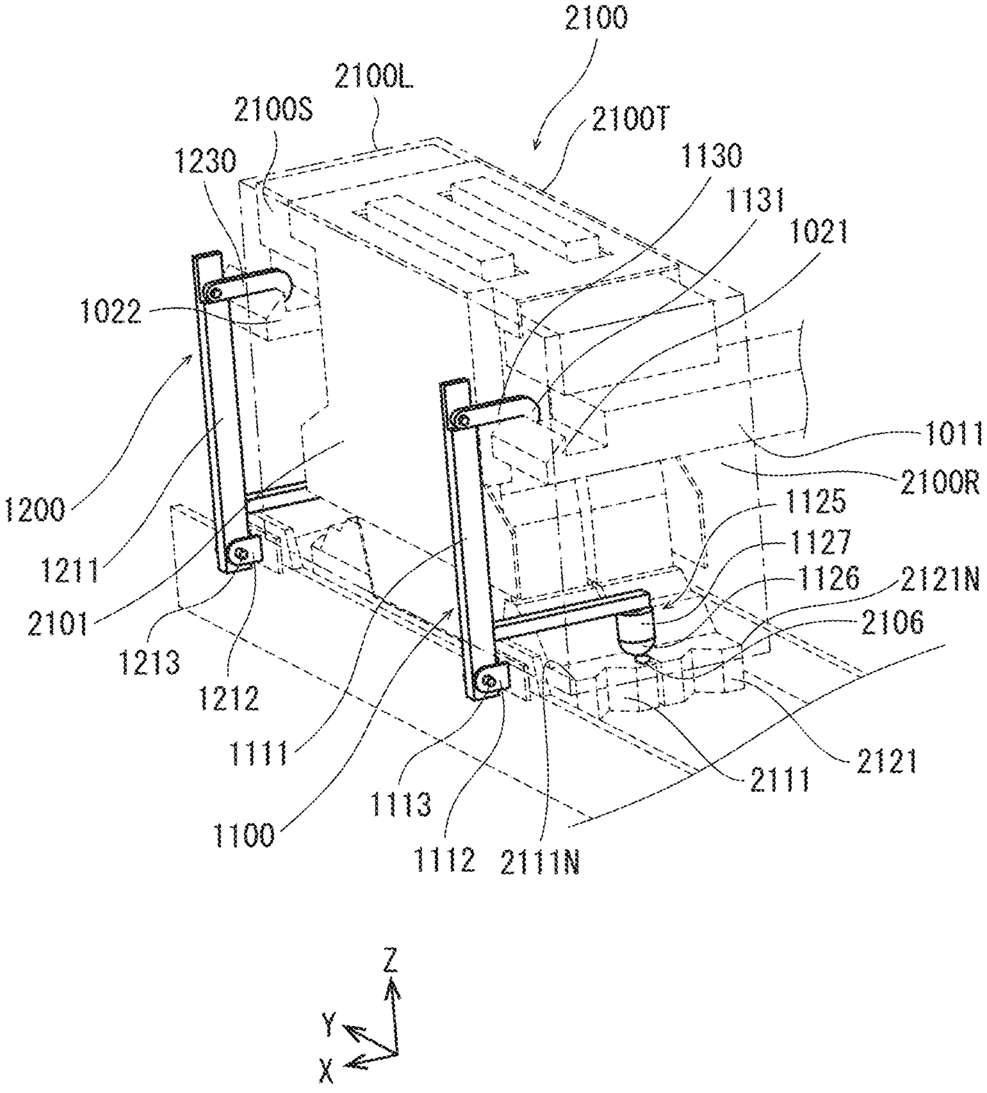
FIG. 4 is a perspective view diagram illustrating a state in which inkjet head module holder assemblies 1100, 1200 are pressing both sides of an inkjet head module 2100.

The angle bearing 1112 is attached to a position outside the enveloping surface of the inkjet head module 2000, and pivotally supports an end of the operating lever 1111. FIG. 4 illustrates an example of the enveloping surface. Surfaces 2100S, 2100T of the enveloping surface in FIG. 4 are planes parallel to the Y-Z plane, and in contact with most extreme portions (exterior body 2101 in FIG. 4) of the inkjet head module 2100 in the X axis direction.

Surfaces 2100R, 2100L of the enveloping surface in FIG. 4 are planes parallel to the X-Z plane, and in contact with most extreme portions (tip 2111N of the bracket 2111, tip 2121N of the bracket 2121 in FIG. 4) of the inkjet head module 2100 in the Y axis direction. The angle bearing 1112 of the present embodiment is attached to one of the standing walls 1006 of the mounting table 1001 as an example of a position outside the enveloping surface of the inkjet head module.

As illustrated in FIG. 2, Height of the angle bearing 1112 is substantially the same height as the brackets 2111, 2121 of the inkjet head module 2100 in the Z axis direction. By swinging the operating lever 1111, the pressure head 1125 of the pressure member 1120 passes through space between the tooth 1011 and the brackets 2111, 2121.

(3-2) Pressure Member 1120

The pressure member 1120 includes a pressure lever 1121, a pin 1122, and the pressure head 1125. When the operating lever 1111 swings, the pressure member 1120 pushes at or in the vicinity of a center position in the X axis direction between the brackets 2111, 2112 of the inkjet head module 2110 illustrated in FIG. 2 (a portion 2106 in FIG. 2).

A base end of the pressure lever 1121 is fixed at a position close to the base end of the operating lever 1111 in FIG. 3A, and the pin 1122 protrudes from a lower side in the Z axis direction free end of the pressure lever 1121.

The pressure head 1125 is attached to a tip of the pin 1122. As illustrated in the cross-section of FIG. 3B, the pressure head 1125 closes one end of a cylinder 1127 with a hemisphere 1126, closes the other end with a disk 1128, and has the pin 1122 inserted through an opening 1128H in the disk 1128.

Inside of the cylinder 1127 is a storage space for a coil spring 1124. A tip of the pin 1122 has a flat plate shape (flat plate 1123), an upper end of the coil spring 1124 is fixed to the flat plate 1123, and elastic force of the coil spring 1124 acts in a direction projecting the pressure head 1125. Length of the cylinder 1127 is set to a value exceeding a sum of length of the coil spring 1124 at maximum compression and length of the pin 1122. This is because when the coil spring 1124 is maximally compressed, external force applied by an operator to the pressure lever 1121 is directly applied to the portion 2106.

(3-3) Lock Member

The lock member is composed of the lock lever 1130 and the lock claw 1131.

The lock lever 1130 extends from near the free end of the operating lever 1111 and the tip of the lock lever 1130 is provided with a lock claw 1131.

The lock claw 1131 is engaging with an engagement claw 1021 provided at a tip of the tooth 1011 in the X axis direction (see FIG. 2 and FIG. 5A), and therefore when an operator turns the operating lever 1111 to become parallel in the Z axis direction, the lock claw 1131 and engagement claw 1021 of the tooth 1011 become engaged.

[4] Work By Operator

Figure 5A:
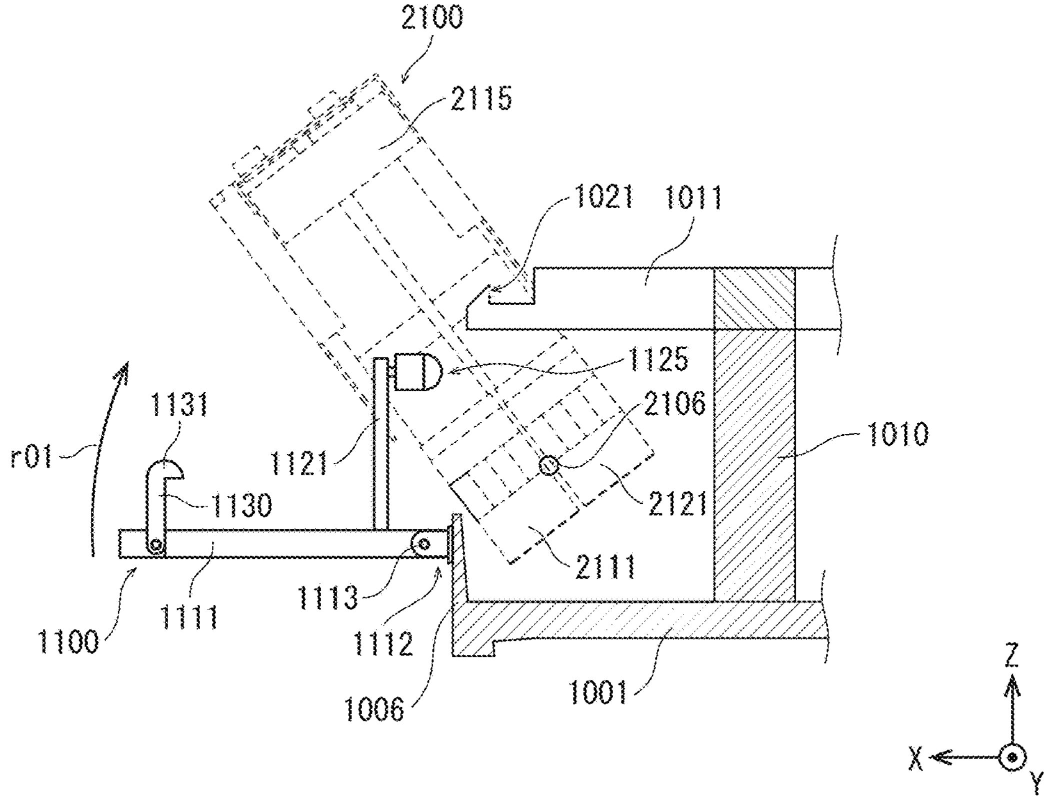
FIG. 5A is a side view diagram of a reinforcing wall 1010 and a tooth portion 1011 in the X-Z plane.
Figure 5B:
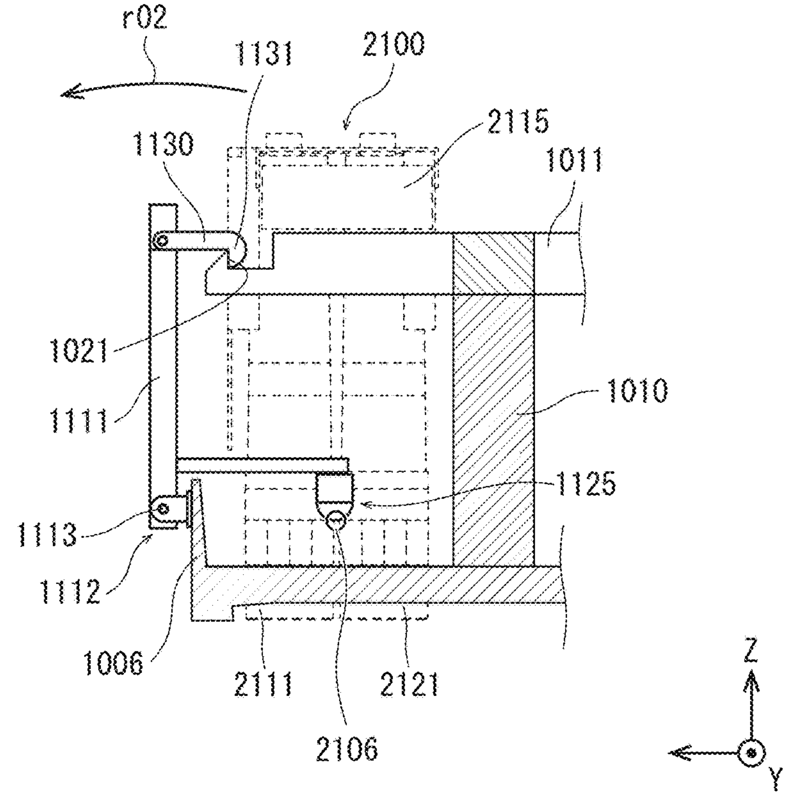
FIG. 5B illustrates a state in which an inkjet head module holder assembly 1100 is switched to elastic biasing.
Figure 6:
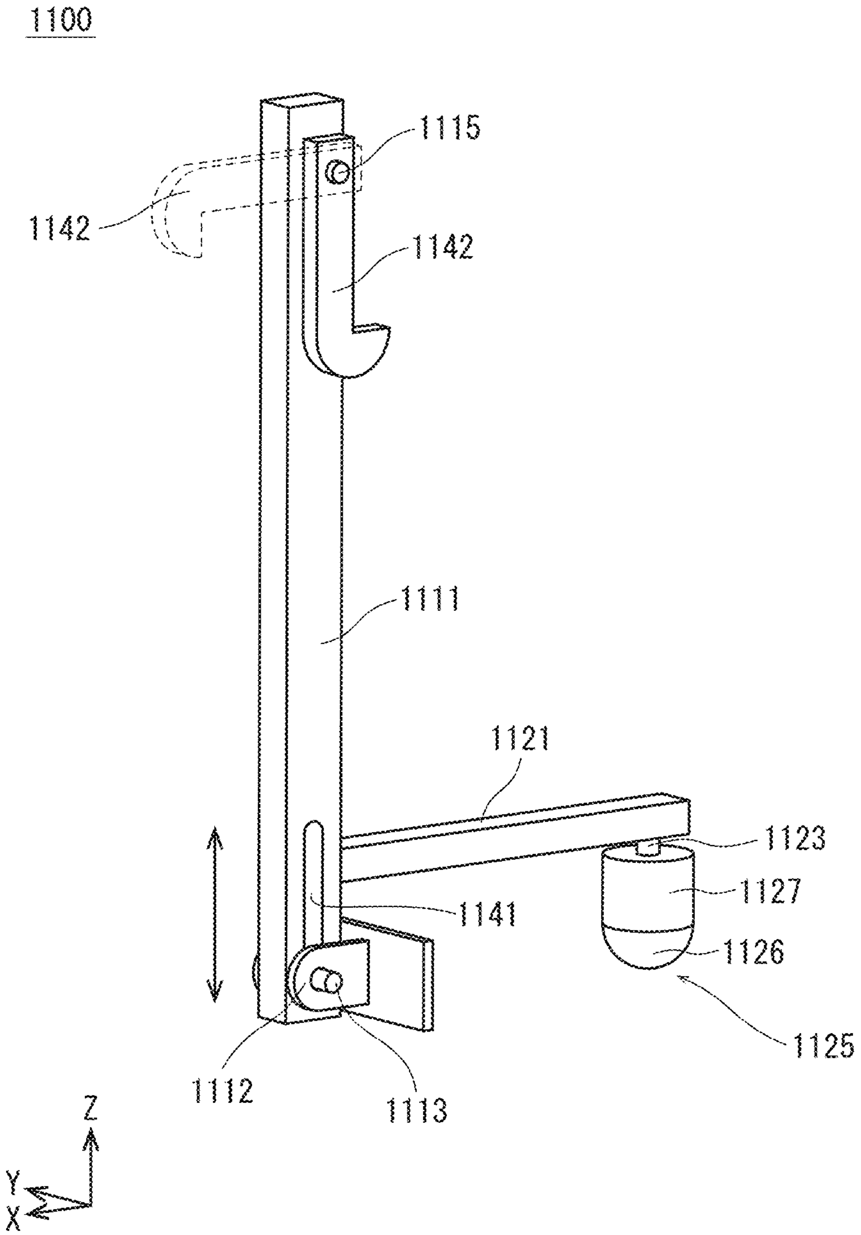
FIG. 6 is a perspective view diagram illustrating the inkjet head module holder assembly 1100 according to Embodiment 2.

Work performed by an operator is described below with reference to FIG. 4, 5A, 5B. In FIG. 5A and FIG. 5B, the mounting table 1001 and the upper structure 1005 are parallel to the X axis direction. This is just an example, and the mounting table 1001 and the upper structure 1005 may be tilted relative to the X axis at a same defined angle. The same applies for FIG. 7 and FIG. 9, described later. Work to be performed by an operator is to mount the inkjet head module on the mounting table 1001, which is an operation to swing the operating lever 1111, and therefore includes pressing using the inkjet head module holder assembly 1110. An initial state is as illustrated by the inkjet head module holder assembly 1100 in FIG. 5A, where the operating lever 1111 is tilted substantially horizontally. When the operating lever 1111 is horizontal, the pressure head 1125 of the pressure member 1120 is not in contact with the portion 2106, and the pressure member 1120 is in the first state.

In this state, the operating lever 1111, the lock claw 1131, and the pressure head 1125 are all located outside the mounting table 1001. As illustrated in FIG. 5A, the inkjet head module 2100 is tilted and placed on the mounting table 1001 from diagonally above, and then the inkjet head module 2100 is move to an upright position. When an operator turns the operating lever 1111 clockwise r01 (start of work), the pressure lever 1121 rotates and the pressure head 1125 enters the cuboid space that wraps around outer edges of the inkjet head module 2100. The base end of the operating lever 1111 is at the same height as the bracket 2111 of the module 2100, and therefore as the pressure head 1125 moves through the surface 2100S of the enveloping surface (see FIG. 4) and enters the space between the ink flow path member 2115 and the brackets 2111, 2121, and with rotation of the pressure lever 1121, the pressure head 1125 comes into contact with the portion 2106. Due to this contact, the pressure member 1120 transitions from the first state to the second state.

As illustrated in FIG. 5A, when the operating lever 1111 is further rotated clockwise r01, the coil spring 1124 in the pressure head 1125 is compressed, and the brackets 2111, 2121 are elastically pressed against the mounting table 1001 by the reaction force. When the operating lever 1111 is rotated until parallel to the Z axis, the coil spring 1124 is compressed to the maximum. At this time, the disk 1128 fixing an upper end surface of the pressure head 1125 is in contact with a lower surface of the pressure lever 1121. At the same time, the lock claw 1131 of the lock lever 1130 advances to the engagement claw 1021 at the tip of the tooth 1011 and engages with the engagement claw 1021. This engagement prevents the operating lever 1111 from swinging anticlockwise (in the direction opposite to the direction it was pushed). As a result, the pressing force on the bracket 2111 due to compression of the coil spring 1124 is maintained as long as the engagement of the lock claw 1131 and engagement claw 1021 is maintained (end of work).

This completes pressing using the inkjet head module holder assembly 1100. If the same work is performed using the operating lever 1211, the angle bearing 1212, and the lock lever 1230 of the inkjet head module holder assembly 1200 illustrated in FIG. 4, the inkjet head module 2100 will be held to the mounting table 1001 by elastic pressure from the coil springs 1124 on both sides in the Y axis direction.

By doing the same for the remaining 14 (7×2) inkjet head module holder assemblies, each of the seven inkjet head modules is pressed from both sides in the Y axis direction, so the seven inkjet head modules are also held to the mounting table 1001.

Even when printing by the inkjet recorder is started, heated ink is supplied to each of the 4×2 inkjet head modules, and each of the inkjet head modules thermally expands, the pressure head 1125 locked by the lock claw 1131 continues applying elastic pressure to the portion 2106 corresponding to length of the coil spring 1124 when pressed by the pressure lever 1121, and therefore orientation of the inkjet head module 2100 mounted on the mounting table 1001 can be stabilized.

The operating lever 1111 is axially supported by the mounting table 1001 to be able to swing about the shaft 1113 inserted through the through hole formed in the angle bearing 1112 and the through hole formed at the base end of the operating lever 1111. Therefore, the shaft 1113 can be removed from the angle bearing 1112, the inkjet head module holder assembly 1100 can be removed from the mounting table 1001 to separate the inkjet head module holder assembly 1100 from the mounting table 1001.

[5] Review

As described above, according to at least one embodiment, transition from the first state to the second state of the pressure member 1120 takes place during work from a start of work of mounting an inkjet head module on a mounting table to an end of the work, during which the operating lever 1111 is operated, the operating lever 1111 being positioned outside an enveloping surface of the ink flow path members 2115, 2116 and the brackets 2111, 2131.

As a result, even when an upper part of the mounting table 1001 is occupied by an ink flow path member, the pressure head 1125 can transition from the first state to the second state without any trouble, and there is no need for an operator to tighten screws. The inkjet head modules can be easily attached and detached from the mounting table 1001, and therefore maintenance of nozzle ejection surfaces can be frequently performed and print quality of the inkjet recorder can be improved.

[6] Embodiment 2

According to Embodiment 1, the operating lever 1111 is swung so that the pressure head 1125 applies elastic pressure and the lock lever 1130 locks. According to Embodiment 2, elastic pressure by the pressure head 1125 and locking by the lock lever 1130 are realized by swinging and sliding the operating lever 1111. The inkjet head module holder assembly 1100 according to Embodiment 2 is described below, with reference to FIG. 6, 7A, 7B, 7C. The operating lever 1111 according to Embodiment 2 has a long hole 1141 formed at the base end, and the shaft 1113 is inserted through the long hole 1141 and the angle bearing 1112.

An engagement lever 1142 is provided to the free end side of the operating lever 1111. A base end of the engagement lever 1142 is pivotally attached to the operating lever 1111 using the pin 1115. Length of the long hole 1141 and length of the engagement lever 1142 are set so as to maintain the following relationship.

Figure 7A:
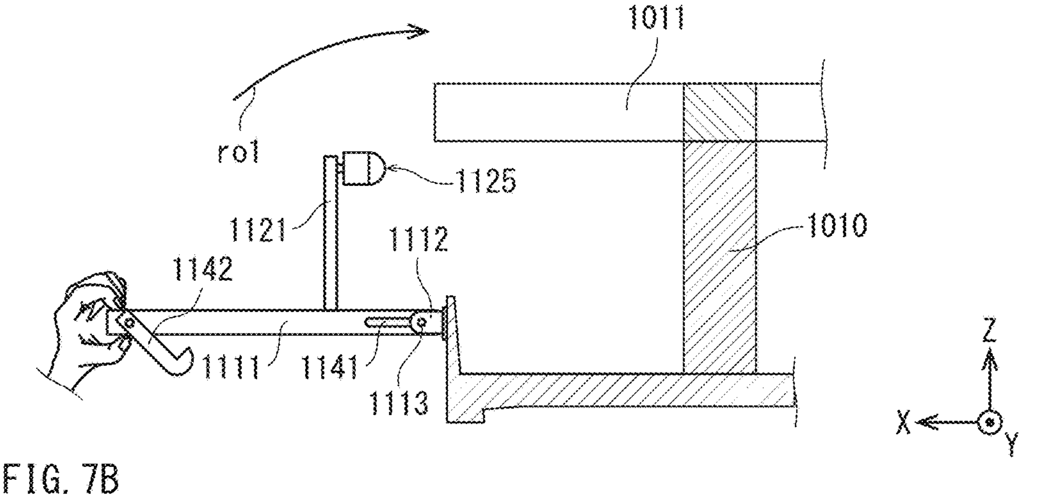
FIG. 7A is a side view diagram of the tooth portion 1011 of Embodiment 2 in the X-Z plane.

FIG. 7A illustrates an initial state, the operating lever 1111 is not swung, and the pressure head 1125 is not in contact with the portion 2106. Accordingly, the pressure member 1120 is in the first state.

Figure 7B:
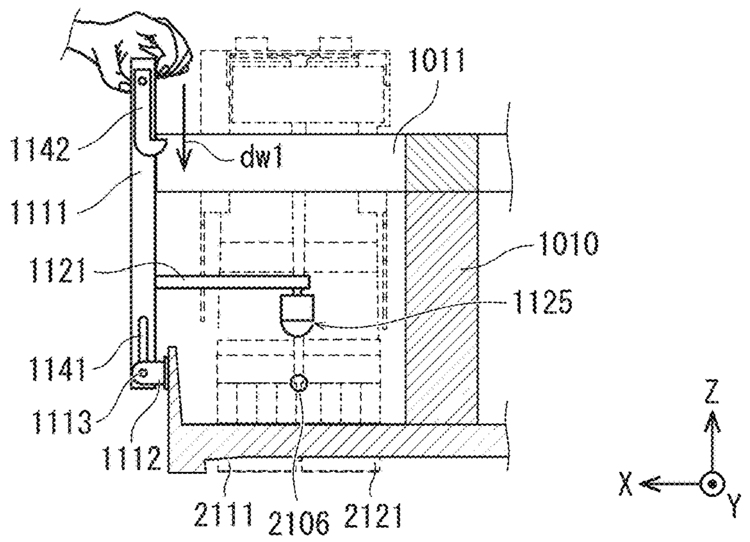
FIG. 7B illustrates a state in which an operating lever 1111 is aligned parallel to the Z axis by a user turning the operating lever 1111 about a shaft 1113 positioned at a lower end of an elongate hole 1141.
Figure 7C:
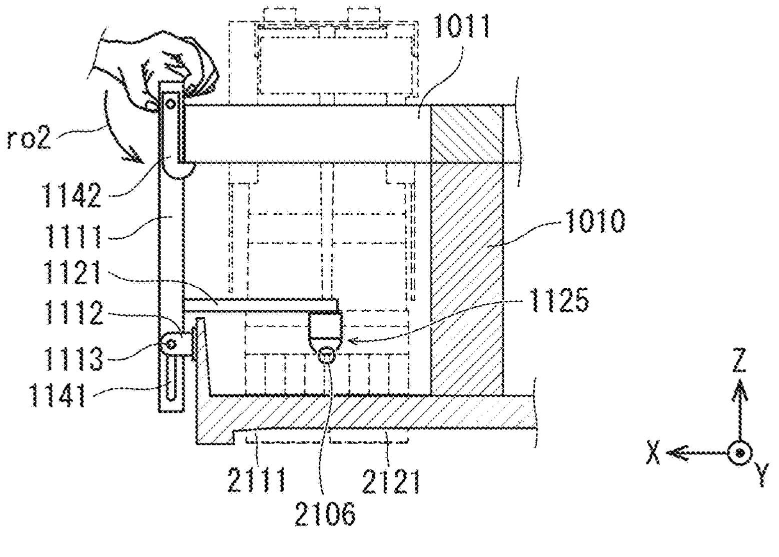
FIG. 7C illustrates a state in which the shaft 1113 is slid from the lower end to an upper end of the elongate hole 1141 while the operating lever 1111 is parallel to the Z axis.

After rotating the operating lever 1111 from an initial state shown in FIG. 7A to an orientation parallel to the Z axis direction (arrow ro1 in FIG. 7A), the operating lever 1111 is pushed down (arrow dw1 in FIG. 7B). When the angle bearing 1112 reaches an upper end in the long hole 1141, the pressure head 1125 comes into contact with the portion 2106, and a lock claw of the engagement lever 1142 engages with a lower surface of extended end of the tooth 1011 (arrow ro2 in FIG. 7C). Due to contact with the pressure head 1125, the pressure member 1120 transitions from the first state to the second state.

When an operator then releases the operating lever 1111, the engaged state is maintained by the elastic restoring force of the coil spring 1124 of the pressure head 1125. This completes the work of mounting the inkjet head module 2100 on the mounting table 1001.

As long as lengths of the long hole 1141 and the engagement lever 1142 are set to maintain the above relationship, the operation to swing the operating lever 1111 from outside the enveloping surface enveloping the ink flow path member 2115 and the brackets 2111, 2131, and the sliding of the operating lever 1111 along the long hole 1141, can transition the pressure member 1120 from the first state to the second state, as in Embodiment 1.

[7] Embodiment 3

Figure 8:
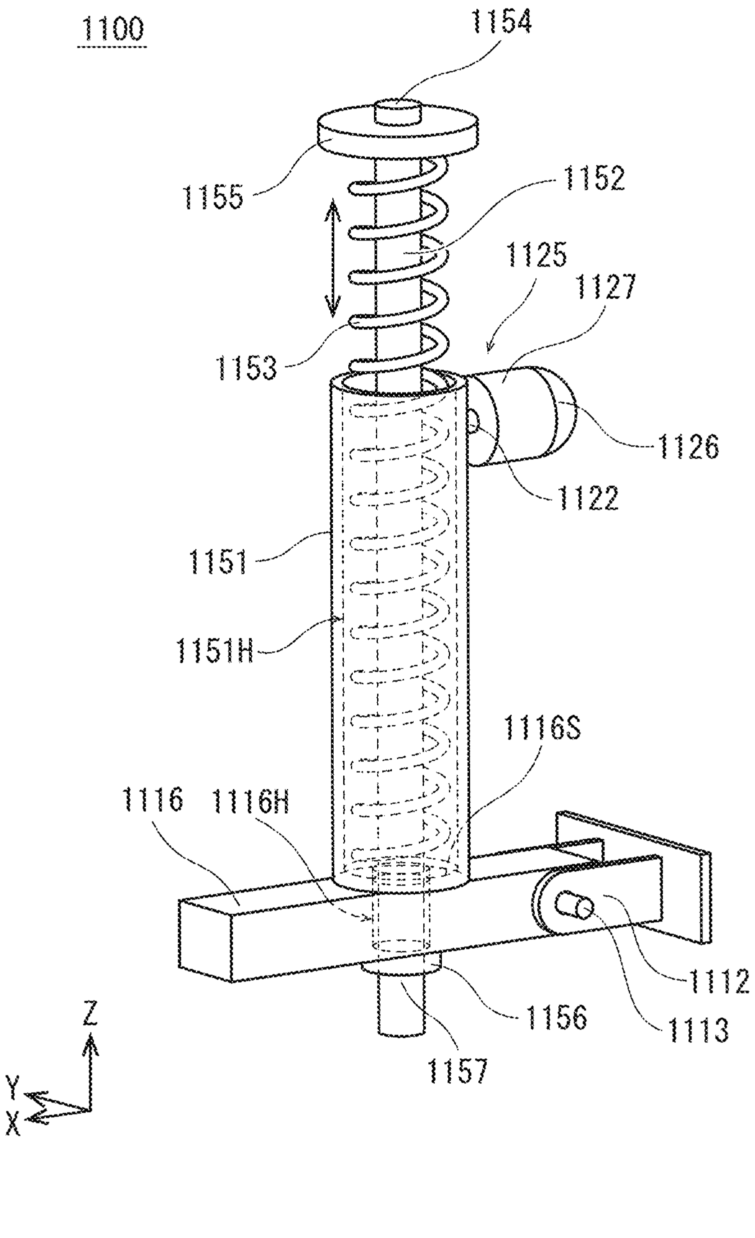
FIG. 8 is a perspective view diagram illustrating the inkjet head module holder assembly 1100 according to Embodiment 3.

According to Embodiment 1, the lock member (the lock lever 1130 and the lock claw 1131 illustrated in FIG. 3) and the pressure lever 1121 are provided at different positions of the operating lever 1111. According to Embodiment 3, the pressure lever has a cylindrical shape, the operating lever is provided with a through hole, and a lock member is supported by a through hole of the pressure lever and the through hole of the operating lever. The inkjet head module holder assembly 1100 according to Embodiment 3 is described below, with reference to FIG. 8.

According to Embodiment 3, a rod-shaped member (rod 1152) is used as the lock member. According to Embodiment 3, the pressure lever 1151 is a tubular body, and an operating lever 1116 is formed with a through hole 1116H communicating with a through hole 1151H of the pressure lever 1151. The rod 1152 as the lock member is inserted though the through hole 1151H and the through hole 1116H.

A flange stopper 1155 is provided on an outside (Z axis positive direction) of the rod 1152 from the through hole 1151H.

Similarly, a stopper ring 1156 is provided on a side of the rod 1152 protruding from the through hole 1116H (Z axis negative direction). A coil spring 1153 is provided between the flange stopper 1155 and an upper surface 1116S of the operating lever 1116, around the rod 1152.

Figure 9A:
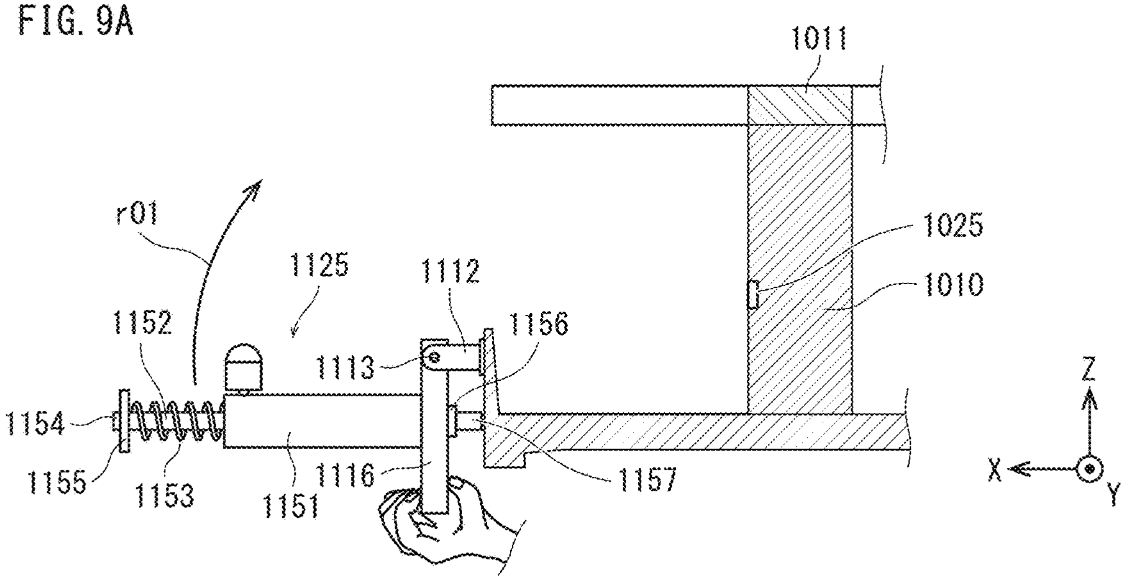
FIG. 9A is a side view diagram of the tooth portion 1011 according to Embodiment 3 in the X-Z plane.
Figure 9B:
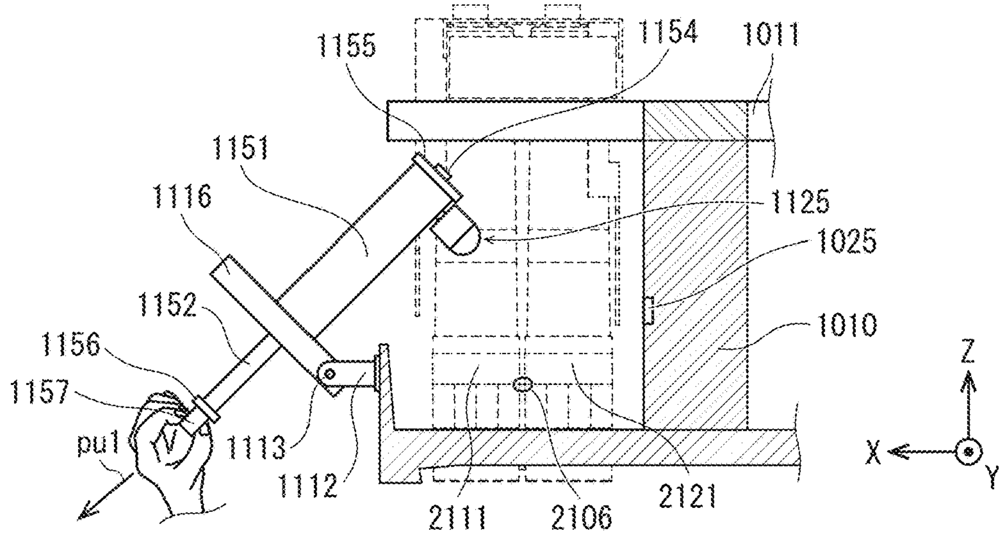
FIG. 9B illustrates a state in which a portion of a rod 1152 excluding a rod end 1154 is housed in a tube of a pressure lever 1151.

The coil spring 1153 is a compression spring, applying an elastic restoring force to the flange stopper 1155 to push the rod 1152 upwards. The rod end 1154 above the flange stopper 1155 functions as an engagement portion that engages with a lock hole (lock hole 1025 in FIG. 9A) of the reinforcing wall 1010. The work of holding an inkjet head module using an inkjet head module holder assembly having this structure is described below with reference to FIG. 9A, 9B, 9C. Initially, the inkjet head module holder assembly 1100 is assumed to have the operating lever 1116 hanging in parallel with the reinforcing wall 1010, as illustrated in FIG. 9A. At the start of work, the portion 2106 is not pressed, and the pressure member 1120 is in the first state. At this time, an operator grips and rotates the operating lever 1116 (arrow r01). If the rod end 1154 is in a state of greatly protruding from the pressure lever 1151, the rod 1152 will come into contact with the tooth 1011, and therefore the operator grips a rear end 1157 and pulls the pressure lever 1152 (arrow pu1), as illustrated in FIG. 9B, to shorten protrusion of the rod 1152 from the pressure lever 1152. In this state, the pressure lever 1152 is rotated while avoiding contact with the tooth 1011.

Figure 9C:
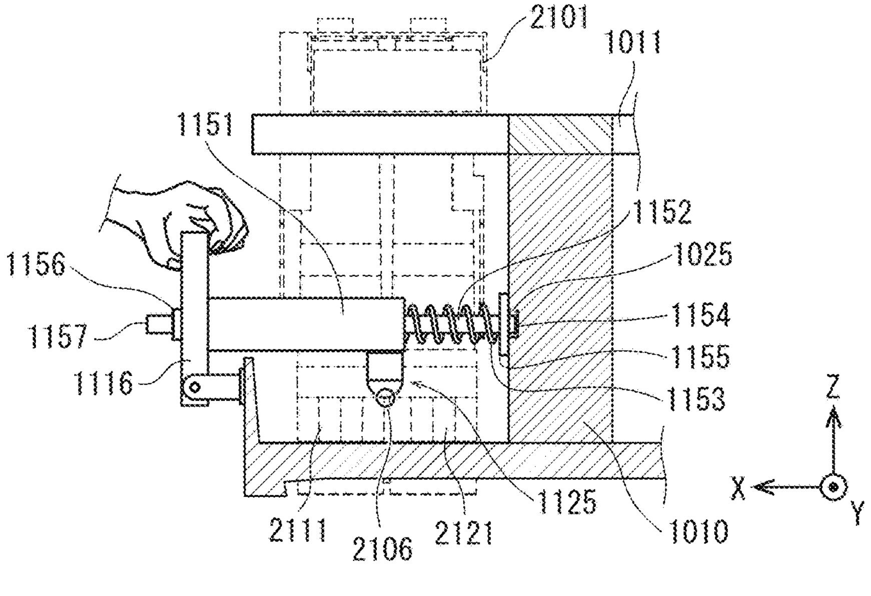
FIG. 9C illustrates a state in which an operating lever 1116 is parallel to the Z axis and the pressure lever 1151 is parallel to the X axis.

When the operator releases the operating lever 1111 while the rod 1152 is parallel with the X axis, the rod end 1154 of the rod 1152 reaches the lock hole 1025 due to the restoring force of the coil spring 1153 and the rod end 1154 engages with the lock 1025, as illustrated in FIG. 9C. The engaged state is maintained by the elastic restoring force of the coil spring 1124 of the pressure head 1125.

[8] Modifications

Although the present invention has been described above based on embodiments, the present invention is not limited to the embodiments described above, and the following modifications can be considered.

(1) The inkjet head module holder assembly 1100 of Embodiments 1, 2, and 3 presses against the brackets 2111, 2112 protruding on both sides in the Y axis direction from a lower portion of the inkjet head module 2100 illustrated in FIG. 2. On a bottom surface of the inkjet head module 2100, a portion of the nozzle holding plate 2105 that does not overlap with the bracket may be pressed by the pressure head 1125. This pressed portion is also included in the portion of the inkjet head module.

(2) By using leverage principles, a burden on an operator when pressing the portion 2106 may be reduced. In using leverage principles, a fulcrum is an axis of the shaft 1113, and a point of action is a pressing point of the pressure head 1125. If a long distance from the fulcrum to a force point is secured, a force (moment) for rotating the operating lever 1111 becomes large. Thus, a grip portion serving as the force point is provided at the free end 1114 of the operating lever 1111 so that an operator may grip the grip portion and rotate the operating lever 1111. It is desirable to press the portion 2106 with a strong force by increasing the moment acting on the operating lever 1111 in this way.

(3) When the lock claw 1131 illustrated in FIG. 5A engages with the engagement claw 1021, if the elastic restoring force of the coil spring 1124 is large, the moment at which the coil spring 1124 tries to rotate the operating lever 1111 is large, and therefore the load of the lock claw 1131 becomes large. It is desirable that a linear distance from the axis of the shaft 1113 to the axis of the pin 1115 through the lock lever 1130 is longer than a linear distance from the axis of the shaft 1113 to the fixed position of the pressure lever 1121 on the operating lever 1111, to reduce the load applied on the lock lever 1130 when the operating lever 1111 rotates. It is desirable to extend life of the lock claw 1131 by reducing the load.

Figure 10A:
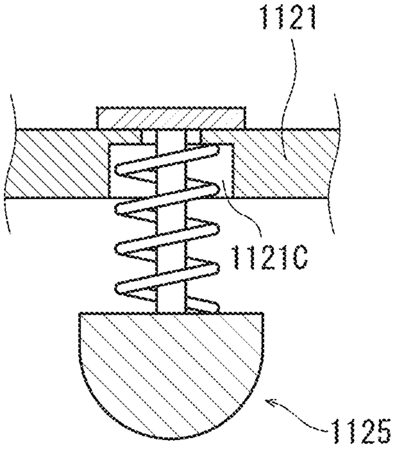
FIGS. 10A through FIG. 10D are diagrams illustrating modifications of a pressure head 1125.
Figure 10B:
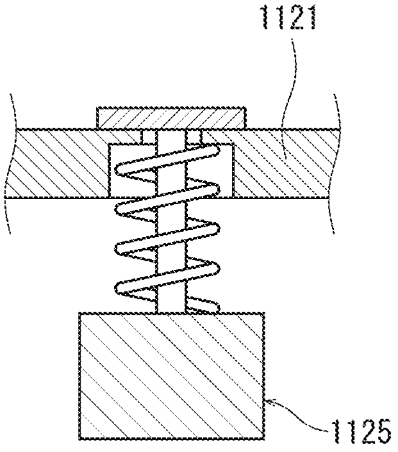
Figure 10C:
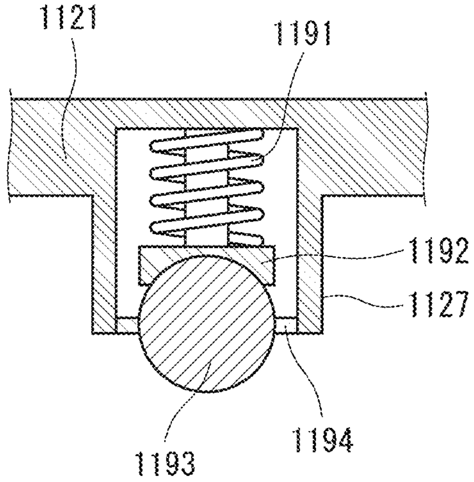
Figure 10D:
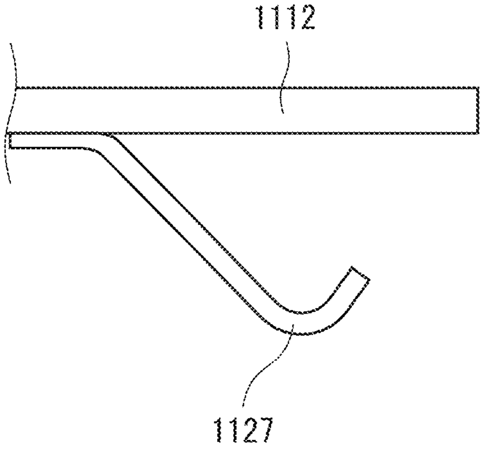

(4) As illustrated in FIG. 10A, a bottomed circular hole 1121C may be formed in the pressure lever 1121 and used as a fixed spring receiver of the coil spring 1124 to apply force to the pressure head 1125. Further, shape of the tip of the pressure head 1125 is not limited to a hemispherical shape. The tip of the pressure head 1125 may be flat, as illustrated in FIG. 10B. Further, as illustrated in FIG. 10C, a spherical member pushed by a spring may be used as the pressure head 1125. In FIG. 10C, a coil spring 1191, a movable spring receiver 1192, and a spherical member 1193 are housed in a cylinder 1127, and a portion of a spherical surface of the sphere is exposed from a cover 1194. The spherical surface exposed from the cover 1194 is exposed from the pressure lever 1121. The operating lever 1111 receives an external force from an operator and presses the portion 2106. When the external force from the operator is continuously received, the spherical member 1193 embeds in the cylinder 1127, and the cylinder 1127 directly presses the portion 2106.

Figure 10E:
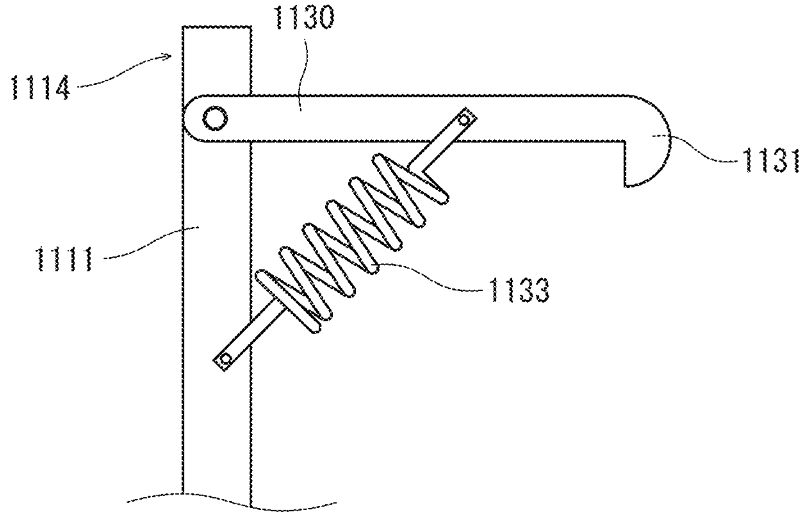
FIG. 10E is a diagram illustrating a modification of a lock lever 1130.

(5) According to Embodiment 1, the lock lever 1130 swings under its own weight and engages with the engagement claw 1021, but when the lock lever 1130 swings under its own weight, the lock claw 1131 might not engage securely with the engagement claw 1021. Therefore, as illustrated in FIG. 10E, the operating lever 1111 and the lock lever 1130 may be connected by a coil spring 1133. Elastic restoring force of the coil spring 1133 means that the lock claw 1131 can reliably engage with the engagement claw 1021.

Figure 11:
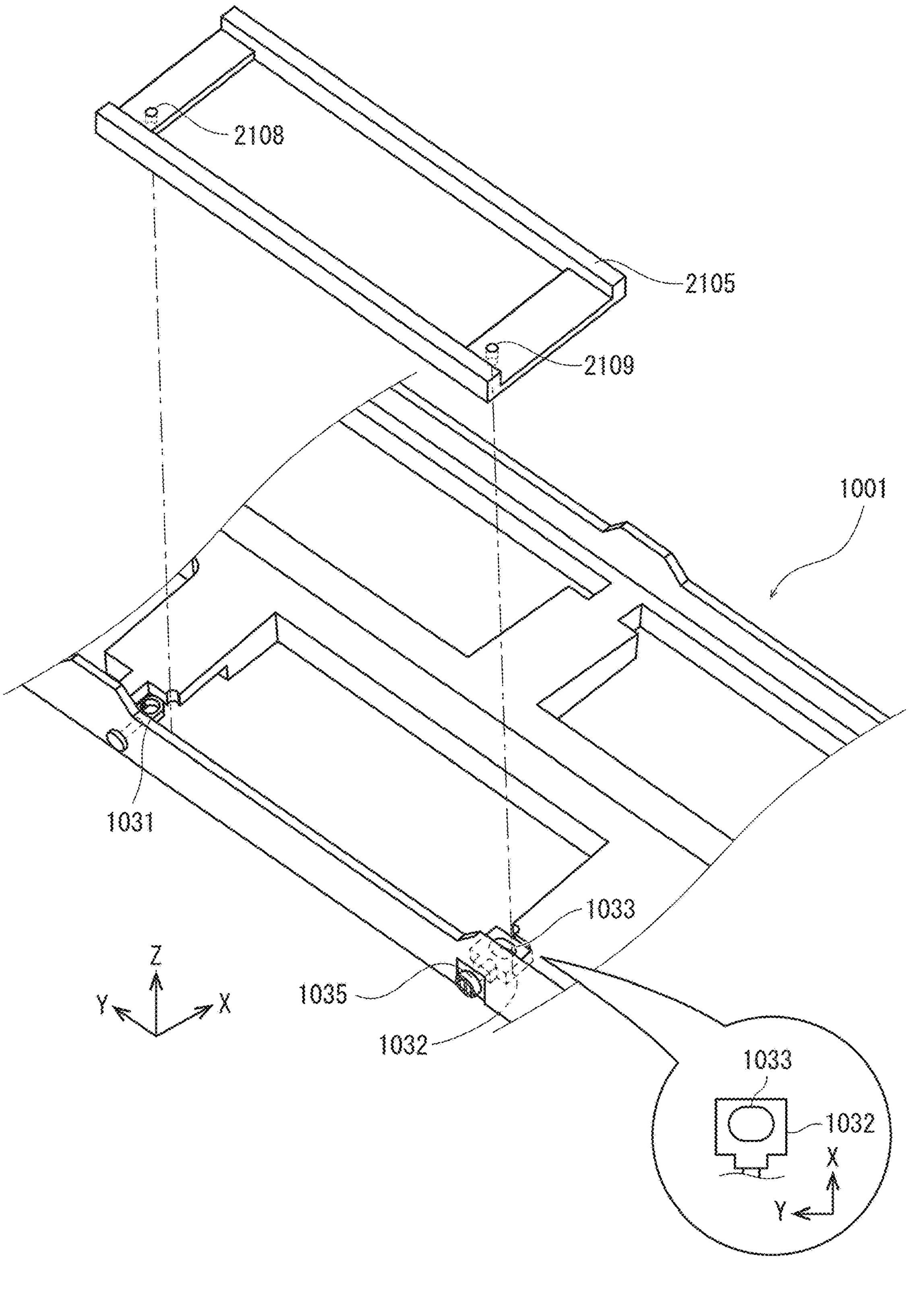
FIG. 11 illustrates a nozzle holding plate 2105 mounted on a bottom surface of an inkjet head module 2100 and a mounting location of the inkjet head module 2100 on the mounting table 1001.

(6) The position adjustment mechanism described in US 2019/283435 may be provided on the mounting table 1001 to adjust a mounted position when an inkjet head module is mounted on the mounting table 1001. FIG. 11 illustrates the position adjustment mechanism described in US 2019/283435. FIG. 11 is a perspective view diagram illustrating a nozzle holding plate 2105 attached to a bottom surface of the inkjet head module 2100 and the mounting location of the inkjet head module 2100 on the mounting table 1001. In FIG. 11, the position adjustment mechanism includes a support 1031 that has a round hole into which a pin 2108 of the nozzle holding plate 2105 is inserted, an adjustment plate 1032 that has a long hole 1033 that extends in the Y axis direction through which another pin 2109 of the nozzle holding plate 2015 is inserted, and an adjustment screw 1035. A screw head of the adjustment screw 1035 is provided with a scale, and by rotating the screw head in accordance with the scale, the adjustment plate 1032 is displaced in the X axis direction and the pin 2109 inserted through the long hole 1033 moves. An amount of movement when turning the adjustment screw 1035 is very small, and therefore movement of the pin 2109 is similar to straight movement. The pin 2109 moves linearly according to rotation of the adjustment screw 1035, and therefore angle of the inkjet head module 2100 with respect to the long direction changes around the pin 2108, and position of the inkjet head module 2100 can be adjusted.

Figure 12:
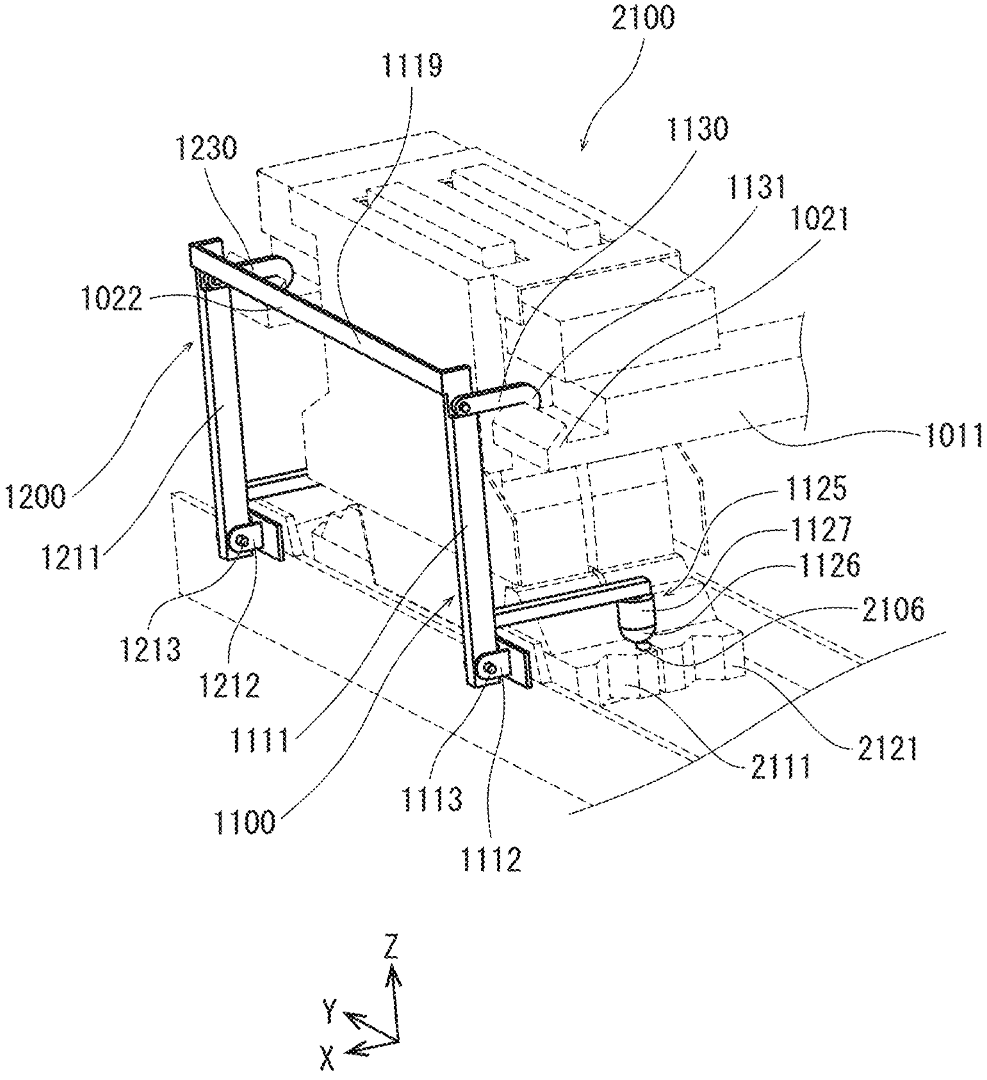
FIG. 12 illustrates an embodiment in which operating levers 1111, 1211 are connected by a handle to collectively operate inkjet head module holder assemblies 1100, 1200.

(7) As illustrated in FIG. 12, the operating levers 1111, 1211 may be connected by a handle 1119, and the swing of the operating lever 1111 and the swing of the operating lever 1211 may be operated by turning of the handle 1119. In this case, when the operation of turning the handle 1119 is performed once, the operating lever 1111 and the operating lever 1211 swing, and therefore labor required for pressing down the inkjet head module 2100 is less than if the operating lever 1111 and the operating lever 1211 are moved individually.

(8) According to Embodiments 1 and 2, an engagement portion is provided to the tooth 1011 and the lock claw 1131 engages at a height of the tooth 1011, but the present disclosure is not limited to this. An engagement portion may be provided above the upper structure and the operating lever may engage with the engagement portion above the upper structure. The upper structure may be raised higher and may engage with the operating lever at a higher position.

Instead of both sides, one side of the inkjet head module 2100 may be pressed by the inkjet head module holder assembly of the present disclosure, and the other side may be pressed by a leaf spring or screw tightening. An example elastic member is a coil spring but is not limited to this example. The elastic member may be a leaf spring or wound spring. Or a sponge may be used instead of a spring. Any component that can apply pressure is acceptable. The elastic member may be an air cushion, or a hydraulic pressure or pneumatic pressure cylinder.

(9) As long as a member applies a defined pressing force to a base of the inkjet head module, pressing may be other than that described according to Embodiments 1-3. Pressing can be a combination of swing and translation. Further, another mechanism may be used as long as it is a mechanism that elastically presses the portion 2106 of the inkjet head module via application of an external force to the operating lever 1111. For example, a crank mechanism may be applied.

(10) The inkjet heads of the inkjet head module 2100 may eject ink by any method. For example, a piezoelectric element or a heat generating element that generates ejection pressure by energization to apply pressure to ink to eject it, a vibrating plate deformed by electrostatic force to eject ink, or an electrostatic ejection method to eject ink. Further, the inkjet head module 2100 may be a "harmonica chip", having a filter member in which a plurality of circulation channels of ink merge.

(11) The operating lever 1111 and the pressure member 1120 may be integrally molded. The operating lever 1111 and the pressure member 1120 are not limited to integral molding and may have separate structures. In this case, it is necessary to transmit force. Further, the pressure member and the operating lever 1111 may be connected through a boosting mechanism.

(12) A printing method performed by the inkjet recorder may be a scan method in which a head carriage, which is the mounting table 1001, is reciprocated in the sub-scanning direction to complete an image in several passes, or a single-pass method in which the mounting table 1001 is fixed and an image is completed in one pass of a conveyed sheet.

Figure 13A:
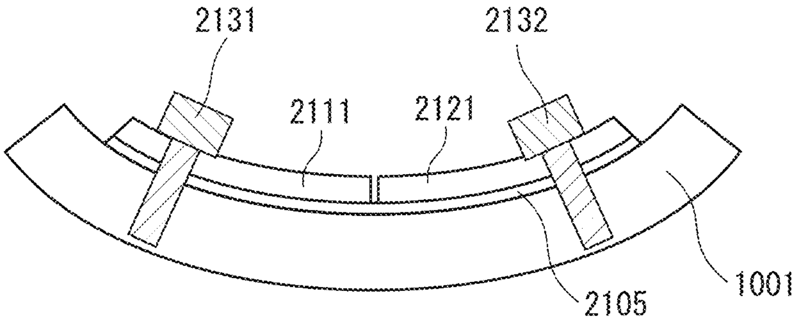
FIG. 13A illustrates a state in which an inkjet head module is attached to the mounting table 1001 in a warped state.
Figure 13B:
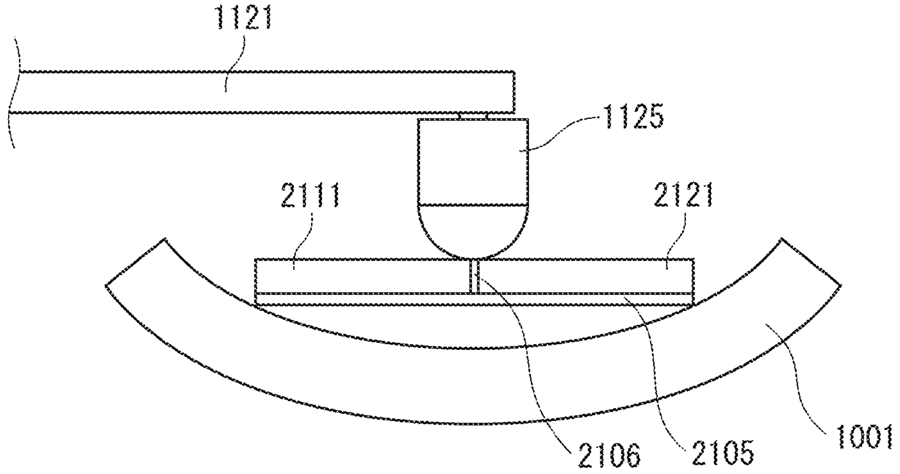
FIG. 13B illustrates a state in which an inkjet head module is pressed against the mounting table 1001 in a warped state by using the pressure head 1125 according to Embodiments 1-3.

(13) As illustrated in FIG. 13A, the mounting table 1001 may be warped due to bending or processing inaccuracy. For the sake of clarity, FIG. 13A illustrates an extremely large degree of warping of the mounting table 1001, but warping may be so small that it cannot be determined by visual inspection whether warping has occurred. According to Embodiments 1-3, when such warping occurs, as illustrated in FIG. 13B, the nozzle holding plate 2105 is pressed by the pressure head 1125 at the portion 2106 by a pressing force in a range in which the nozzle holding plate 2105 does not bend, and therefore the inkjet head module 1100 can be held on the mounting table 1001 while maintaining flatness of the nozzle holding plate 2105. On the other hand, if the nozzle holding plate 2105 were firmly fixed by screws 2131, 2132 as illustrated in FIG. 13A, the nozzle holding plate 2105 would warp in the shape of the mounting table 1001, but such warping can be prevented by use of the pressure head 1125.

(14) The inkjet head module holder assembly is described as being provided on the standing walls 1006 of the mounting table 1001 but is not limited to this example. An inkjet head module holder assembly may be provided on an upper surface of the mounting table 1001 at any position other than an area occupied by the inkjet head module, as long as it is outside a space surrounding the inkjet head module. According to embodiment 1,

(15) According to Embodiment 1, the length of the cylinder 1127 is set to a value exceeding the sum of the length of the coil spring 1124 that is maximally compressed and the length of the pin 1122, and as illustrated in FIG. 5B, when an operator rotates the operating lever 1111, the pressure lever 1121 presses the cylinder 1127 to directly apply external force to the portion 2106, but the present disclosure is not limited to this example. A structure may be implemented in which the pressure lever 1121 does not press the cylinder 1127, but instead exerts an elastic force via the coil spring 1124 on the pressure head 1125 to press the portion 2106.

Although embodiments of the present invention have been described and illustrated in detail, it is clearly understood that the same is by way the disclosed embodiments are made for purposes of illustration and example only and not limitation. The scope of the present invention should be interpreted by terms of the appended claims.

What is claimed is:

1. A holder assembly that holds a head module including an inkjet head on a mounting table, the holder assembly comprising:

a pressure member that presses a portion of the head module adjacent to the mounting table; and an operation member that transitions the pressure member from a first state to a second state when work of mounting the head module on the mounting table is performed, wherein in the first state, the pressing by the pressure member is deactivated, and in the second state, the pressing by the pressure member is activated, and the operation member exists outside an enveloping surface of the head module during the work of mounting the head module on the mounting table;

wherein:

the operation member includes an operating lever, the pressure member includes a pressure lever fixed onto the operating lever and a pressure head provided on a tip of the pressure lever, and the pressure head includes an elastic member that applies an elastic force to the portion of the head module;

wherein a base end of the operating lever is pivotally supported at a position outside the enveloping surface, and in response to swinging of the operating lever, the pressure head elastically presses the portion of the head module;

wherein the head module further comprises:

a bracket extending sideways from a lower portion of the inkjet head; and an ink flow path member extending sideways from an upper portion of the inkjet head, the enveloping surface envelops the bracket and the ink flow path member, and in response to the swinging of the operating lever, the pressure lever moves through the enveloping surface into a space between the bracket and the ink flow path member, until the pressing head reaches the portion of the head module.

2. The holder assembly of claim 1, wherein, in response to the swinging of the operating lever, the elastic member is elastically compressed until the pressure lever and the pressure head are in contact with each other.

3. The holder assembly of claim 1, wherein the operating lever has a grip that can be gripped by the user, and a first distance along a longitudinal direction of the operating lever from the position where the operating lever is pivotally supported to the grip is longer than a second distance along a longitudinal direction of the operating lever from the position where the operating lever is pivotally supported to a position where the base end of the pressure lever is fixed.

4. The holder assembly of claim 1, wherein the pressure lever has a cylindrical shape into which a lock member is slidably inserted, in response to sliding of the lock member, a tip of the lock member approaches a hole provided in a reinforcement of the mounting table.

5. A holder assembly that holds a head module including an inkjet head on a mounting table, the holder assembly comprising:

a pressure member that presses a portion of the head module adjacent to the mounting table; and an operation member that transitions the pressure member from a first state to a second state when work of mounting the head module on the mounting table is performed, wherein in the first state, the pressing by the pressure member is deactivated, and in the second state, the pressing by the pressure member is activated, and the operation member exists outside an enveloping surface of the head module during the work of mounting the head module on the mounting table;

wherein:

the operation member includes an operating lever, the pressure member includes a pressure lever fixed onto the operating lever and a pressure head provided on a tip of the pressure lever, and the pressure head includes an elastic member that applies an elastic force to the portion of the head module;

wherein a base end of the operating lever is pivotally supported at a position outside the enveloping surface, and in response to swinging of the operating lever, the pressure head elastically presses the portion of the head module;

wherein the operation member further comprises a lock lever on the operating lever, and the lock lever extends from a position separated from a position where the base end of the pressure lever is fixed.

6. The holder assembly of claim 5, wherein a lock claw is provided at a free end of the lock lever, in response to the swinging of the operating lever, the lock claw approaches an engagement portion of a tooth-shaped structure provided above the mounting table and engages with the engagement portion.

7. The holder assembly of claim 5, wherein the operating lever is pivotally supported at the position of the mounting table outside the enveloping surface to be slidable in the longitudinal direction of the operating lever, and in response to the sliding of the operating lever, the pressure head approaches the portion of the head module.

8. The holder assembly of claim 7, wherein a lock claw is provided at a free end of the lock lever, the lock claw of the lock lever approaches a tip of a tooth-shaped structure provided above the mounting table in response to the sliding of the operating lever and engages with the tip of the tooth-shaped structure.

9. The holder assembly of claim 6, wherein the position where the operating lever is pivotally supported is a side surface of the mounting table, and a first distance from the position where the operating lever is pivotally supported to the engagement position of the lock claw is longer than a second distance along the longitudinal direction of the pressure lever from the position where the operating lever is pivotally supported to a position of the pressure head.

10. An inkjet recorder that conveys a recording medium and forms an image using an inkjet method on a conveyed recording medium, the inkjet recorder comprising:

a mounting table;

head modules each including an inkjet head;

an ink supply member that supplies heated ink to the head modules; and holder assemblies each comprising:

a pressure member that presses a portion of a corresponding one of the head modules adjacent to the mounting table; and an operation member that transitions the pressure member from a first state to a second state when work of mounting the head module on the mounting table is performed, a position adjuster that adjusts mounting positions of the head modules on the mounting table while the head modules are held by the holder assemblies wherein in the first state, the pressing by the pressure member is deactivated, and in the second state, the pressing by the pressure member is activated, and the operation member exists outside an enveloping surface of the corresponding one of the head modules during the work of mounting the head module on the mounting table; wherein a pair of pins protrude from the portions of each of the head modules, and the position adjuster includes a pair of insertion points into which the pair of pins are inserted, and the pair of insertion points are supported on the mounted table to be slidable in a direction perpendicular to a direction along which the head modules are arranged.

11. The inkjet recorder of claim 10, wherein each of the head modules includes an ink flow path member disposed above the mounting table to allow transfer of ink to and from an adjacent head module, tooth-shaped structures are arranged above the mounting table at defined intervals, and support the ink flow path members, and the portions of the head modules are each below the ink flow path members and the tooth-shaped structures.

12. The inkjet recorder of claim 10, wherein the pressure member is attached to the mounting table so as to be detachable.

13. The inkjet recorder of claim 10, wherein the head modules are arranged along the mounting table, and a pair of the holder assemblies are provided for each of the head modules so that the portions of the head modules on both sides of each of the head modules in the direction along the mounting table are pressed against the mounting table.

14. The inkjet recorder of claim 13, wherein each of the pairs of the holder assemblies individually or in coordination with each other presses the portion of a corresponding one of the head modules.

15. The inkjet recorder of claim 10, wherein the head modules are arranged along the mounting table, and the holder assemblies are provided in one to one correspondence with the head modules, so that each of the holder assemblies presses against the portion of the corresponding one of the head modules on one side of the head module in a direction along which the head modules are arranged.

* * * * *